United States Patent [19]

Walker et al.

[11] 3,789,158

[45] Jan. 29, 1974

[54] DEPOSITED STRIP HEADS

[75] Inventors: Peter Albert Walker, Stevenage; Justus Ernest Humpoletz, Letchworth, both of England

[73] Assignee: International Computers Limited, London, England

[22] Filed: Nov. 1, 1971

[21] Appl. No.: 194,181

[30] Foreign Application Priority Data

Nov. 7, 1970 Great Britain .................... 53059/70

[52] U.S. Cl. 179/100.2 C, 340/174.1 F, 346/74 MC

[51] Int. Cl. .............................................. G11b 5/12

[58] Field of Search ............... 179/100.2 C, 100.2 P; 340/174.1 F, 174.1 E; 346/74 MC

[56] References Cited

UNITED STATES PATENTS

| | | | |
|---|---|---|---|
| 3,344,237 | 9/1967 | Gregg | 179/100.2 C |
| 3,662,119 | 5/1972 | Romankiw et al. | 179/100.2 C |
| 3,662,361 | 5/1972 | Mee | 179/100.2 C |
| 3,564,558 | 2/1971 | Tolman et al. | 346/74 MC |
| 3,639,699 | 2/1972 | Tiemann | 179/100.2 C |
| 3,611,417 | 10/1971 | Sauter et al. | 179/100.2 C |

OTHER PUBLICATIONS

IBM Technical Disclosure Bulletin, E. Max, Thin-Film Magnetic Head, Vol. 13, No. 1, June 1970, pages 248–249.

*Primary Examiner*—Vincent P. Canney
*Assistant Examiner*—Alfred H. Eddleman
*Attorney, Agent, or Firm*—Frederick E. Hane et al.

[57] ABSTRACT

A magnetic recording head including a composite element formed by a inner layer of conductive material sandwiched between two layers of readily magnetisable material. A conductive outer layer is disposed over at least a portion of each magnetisable layer, these outer layers being electrically interconnected solely by the inner conductive layer.

3 Claims, 9 Drawing Figures

DEPOSITED STRIP HEADS

BACKGROUND OF THE INVENTION:

1. Field of the Invention

The present invention relates to magnetic recording and reproducing devices.

Recent developments in high speed data processing equipment have required that data recording on a record medium be translated into electrical signals, or vice versa, at increasingly higher rates in order for the overall speed of a system to be improved. Thus, it is desirable to 'write' data on a record medium or 'read' data from such a medium as rapidly and reliable as possible. It is also desirable to record as much data as possible on a particular area of a record medium to reduce the cost of storing a given number of data signals.

It is axiomatic that operatings speeds of magnetic heads can be increased by reading and writing at higher frequencies. A problem which becomes particularly severe at higher operating frequencies is that the efficiency of conventional magnetic ring heads decreases due to the increased magnetic losses in the head material. This situation may be significantly improved by the use of a "strip head" in which losses are considerably less than in the ring head. A theoretical analysis shows in fact that strip head efficiency increases as the operating frequency increases. Also, it has been found that by providing strip heads with 'transmission line' connections to the heads, losses at high operating frequencies are further reduced.

2. Description of the Prior Art

Such heads have a 'single turn' or conductor positioned in a suitable magnetic circuit near a magnetic recording medium for producing a magnetic field during a writing operation. An example of a single turn head which is particularly suitable for data recording operations is found in British Pat. specification No. 1,191,517, which patent is assigned to the assignees of the present application. In this patent a thin planar conductor is positioned between blocks of ferrite with one edge of the conductor being in a plane parallel to an virtually coplanar with the plane of the recording medium. Also, the thin conductor is connected at either end to conductors forming a strip transmission line.

SUMMARY OF THE INVENTION

According to the present invention there is provided a strip head for magnetic recording apparatus, comprising a composite element including a layer of conductive material, first and second layers of readily magnetisable material positioned adjacent opposite faces of said layer of conductive material and first and second outer conductors disposed over at least a portion of said first and second layers respectively, said first and second outer conductors being electrically interconnected solely by said conductive material.

According to one aspect of the present invention, the outside conductors are electrically connected to a respective pair of strip transmission line conductors by inserting the composite head between the conductors of the transmission line and electrically connecting corresponding conductors together.

According to another aspect of the present invention the outside conductors are integrally formed with the conductors of the strip transmission line. In this embodiment, the outside conductors are, in fact, the ends of the strip transmission line.

BRIEF DESCRIPTION OF THE DRAWINGS

A strip head for magnetic recording apparatus embodying the present invention will now be described, by way of example, with reference to the accompanying drawings.

DESCRIPTION OF THE PREFERRED EMBODIMENTS

Figures 1, 2, 3, 4:
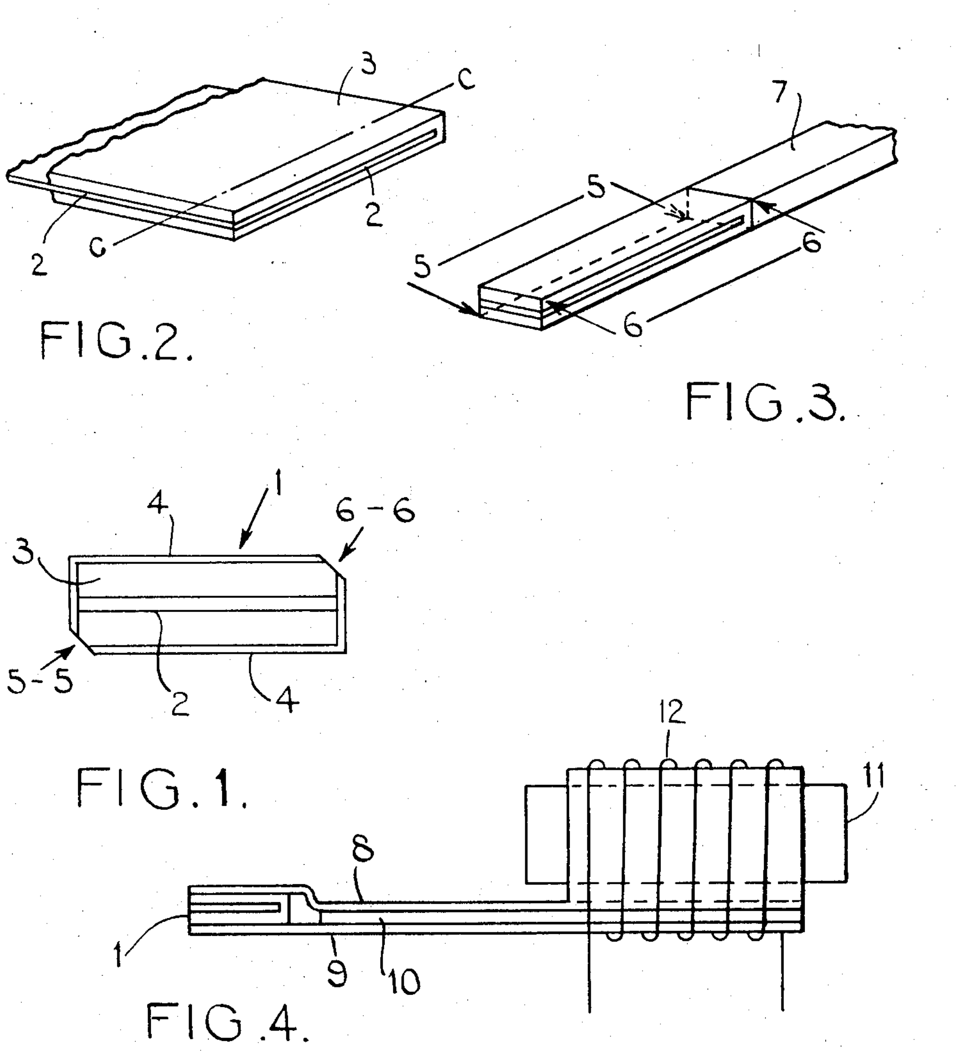
FIG. 1 shows a front view of a completed segment for use with a strip head.
FIG. 2 shows to a smaller scale than that of FIG. 1 a diagrammatic view of a portion of a strip head.
FIG. 3 shows to a smaller scale than that of FIG. 1 a diagrammatic view of a head segment during preparation thereof.
FIG. 4 shows a diagrammatic view of a strip head inserted in a transmission line with an integral transformer connected thereto.

Referring first to FIG. 1 a front view of a strip head 1 is shown. The head 1 is comprised of a layer of conductive material 2 which may be rhodium. Ferrite members 3 are provided on opposite faces of conductive layer 2. Top and bottom layers of a further conductive material 3 are provided with diametrically opposed corners 5—5 and 6—6 having been removed. A portion of the top layer of conductive material 4 extends down the left side of the head and provides an electrical contact to the left edge of material 2. Similarly, a portion of the bottom layer of conductive material 4 contacts the right edge of conductive material 2. Conductive material 4, may for example, be comprised of copper. Thus, an electrical connection between top and bottom layers of conductive material 4 is provided by the layer of conductive material 2, the latter material effectively forming a gap between ferrite layers 3.

The strip head 1 of FIG. 1 may be produced by the following method,

As seen in FIG. 2, a ferrite material is deposited around a planar conductor 2 with the front and side faces of the ferrite 3 being removed by any suitable technique, such as lapping. Conductor 2 will be supported by a suitable substrate, which may be ceramic, for example, in order to allow the deposition of the ferrite. such a substrate may be removed at a later time by conventional techniques. In order to produce high resolution heads, it will be necessary to successively deposit a plurality of layers of suitable materials. However, for low resolution heads the strip conductor 2 could be comprised of a suitable rolled sheet material. The resulting article is then sliced along a number of lines parallel to line C—C and then mounted on a jig 7 (FIG. 2). The article is then copper plated to form a conductive layer 4 therearound. The jig 7 is removed while the copper on the front and rear faces of the article is removed. In order to provide the necessary connections the corners along lines 5—5 and 6—6 are removed as shown in FIG. 1. This may be done by either grinding or etching both the copper layer 4 and the ferrite 3. FIG. 4 illustrates a strip transmission line in the form of planar conductors 8 and 9 separated by an insulating member 10. The strip head 1 is positioned between the conductors 8 and 9. The head 1 may be soldered or spot welded to form secure electrical connections to the conductors 8 and 9. The conductors 8 and 9 integrally form one winding of a transformer having a core 11 of magnetic material, which latter may be in the form of a closed magnetic circuit, and an insulated conductor 12 as the other transformer winding. Thus, by closely coupling the transformer 11, 12 etc., to the head 1 by the transmission line conductors 8 and 9, inductive losses are reduced such that reading and writing of data may be satisfactorily effected even at relatively high frequencies.

Figures 5, 6, 7:
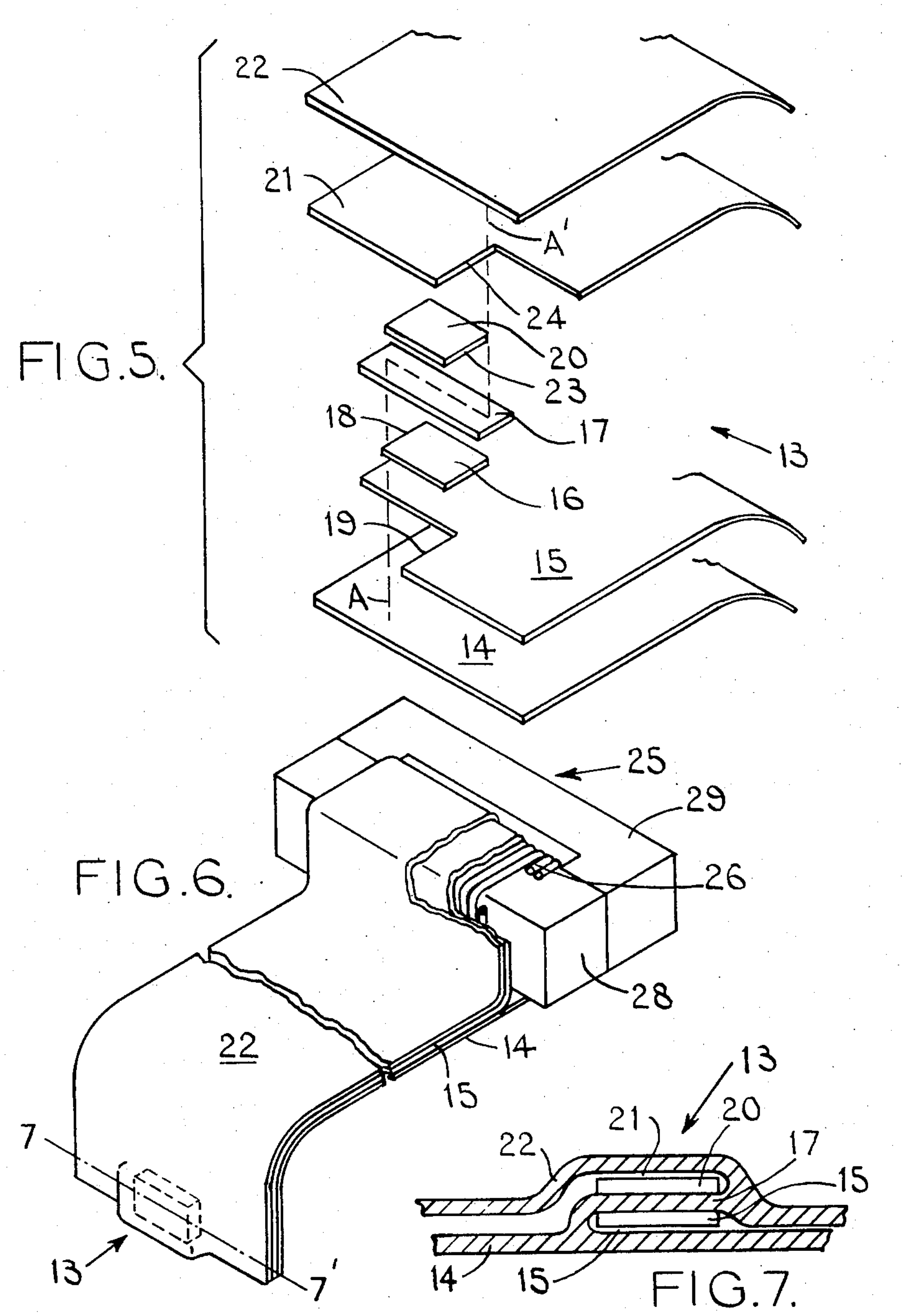
FIG. 5 shows an exploded diagrammatic view of a portion of a deposited strip head.
FIG. 6 shows a diagrammatic view of a deposited strip head array with a cantilever strip transmission line and integral transformer.
FIG. 7 shows a sectional view along the line 7–7′ or FIG. 6.

In another embodiment, as shown in FIG. 5, a strip head 13 is provided in which the elements of the head are deposited in a series of layers. A first conductive material 14, which may be rhodium or platinum is provided while an insulating layer 15 is deposited therein. A portion of the insulating layer 15, shown as a notch in FIG. 5 is removed while a thin ferrite layer or member 16 is positioned over a portion of insulating layer 15. A conductive member 17 which may be rhodium is positioned over ferrite member 16 and extends over the notched portion of insulating layer 15 to allow an electrical contact to be formed between conductive layer 14 and one end of member 17. Preferably, the edge 18 of ferrite member 14 is aligned with edge 19 of insulating layer 15 to allow such a contact to be made between conductors 14 and 17. The remaining layers of the head 13 include a ferrite layer or member 20, insulating material 21 and conductor 22. Ferrite members 15 and 20 may be in contact with conductors 14 and 22, respectively. Again, edge 23 of the ferrite member 20 is aligned with an edge 24 of the insulating material 21 to allow an electrical connection to be made between conductors 17 and 22. Thus, it will be seen that strip head 13 includes a thin conductor 17 with ferrite layers 20 and 15 on either side thereof and around the rear edge of conductor 17. Also, a conductive path is provided along line A–A′ between conductors 14 and 22 via conductive layer 17. It will be appreciated than an electrical contact, say between conductors 14 and 17, may be formed by depositing the layer 17 over the ferrite 15 and the conductor 14 during the formation of head 13.

Referring now to FIG. 6, there is shown a complete head-transmission line-transmission structure. Head 13 is integrally formed with conductors 14 and 22 of the strip transmission line which in turn forms one winding of transformer 25. Coil 26 forms a second transformer winding while blocks of magnetic material 28 and 29, which may be similar to core 11 of FIG. 4, complete the structure of transformer 25. As a result of presenting a low series impedance between transformer 25 and head 13, conductors 14 and 22, which may be formed by conventional deposition methods act effectively as a strip transmission line, the conductors 14 and 22 being separated by insulating material 15. In practice, transformer 25 and associated driving circuits (not shown) are mounted on a pad (not shown) with the length of the cantilevered transmission line 14, 22 being determinative of the desired position of the head 13. It will be realised that a plurality of cantilevered transmission line arrangements can be mounted on a pad in a comb-like array to provide a multi-head assembly. Also, two comb-like arrays may be interleaved with each array being mounted on an opposite side of the pad. Such a pad may be in the form of an externally pressurised air bearing. The grouping of a plurality of assemblies (FIG. 6) on a single pad will allow the possibility for optimised sharing of electronics, which, can result in better noise immunity.

The final structure of head 13 is shown in greater detail by the sectional view of FIG. 7 taken along the line 7–7′ of FIG. 6. Outside conductors 14 and 22 are separated from associated ferrite layers 15 and 20 by insulating materials 15 and 21, respectively, although such insulation is not strictly necessary as ferrite will provide suitable insulation. The layer of conductive material 17 between ferrite layers 20 and 15 is connected at the left hand edge to outside conductor 14 and at the right hand edge to outside conductor 22.

Figure 8:
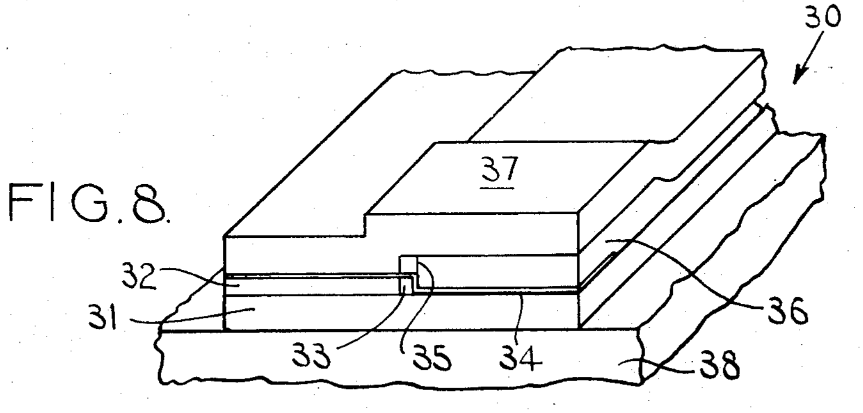
FIG. 8 shows a diagrammatic view of a further embodiment of a strip head.

A further embodiment of the strip head of the present invention is shown in FIG. 8. The head 30 is comprised of a first layer of conductive material 31, a portion of which is covered by an insulating material 32. A layer, or strip of ferrite material 33 is positioned adjacent one end of insulating material 22 while a thin strip of conductive material 34 is placed over insulating layer 32, ferrite 33 and conductor 31. Another strip or layer of ferrite 35 is placed on conductor 34 substantially above ferrite 33. A further layer of insulating material 36 is positioned over the remaining exposed portion of conductor 34, while a top conductor 37 is positioned over conductor 34, ferrite 35 and insulating material 36.

A substrate 38 is provided for the purpose of allowing all elements of the head 30 to be deposited by various deposition techniques. Substrate 38 may be of any suitable ceramic material while insulating materials 33 and 32 may be any suitable material, such as a glass ceramic which withstands ferrite processing temperatures. Furthermore, conductive layers 31 34 and 37 may be comprised of rhodium. It will be seen that conductive layers 37 and 31 are electrically connected together by conductors 34 with the latter conductor occupying the 'gap' between ferrite layers 33 and 35.

The strip heads of the present invention have been shown in several specific geometric configurations. For example, the strip head 1 of FIG. 1 has been shown as having a rectangular cross-section, but, as will be realized, other cross-sections, will be suitable if portions can be removed to form the necessary electrical connections. Clearly, the purpose of forming the proper electrical connections is more important than the geometry of the head. Similarly, with respect to FIG. 5, while rectangular notches in insulating layers 15 and 21 are shown, other notch shapes may be employed. Also, while edges 19 and 18 are aligned with one another, such alignment is not critical as long as a suitable electrical connection, as shown by line A–A′ is formed. Again, it is important that the layers are positioned such that all necessary electrical contacts are made.

It will be appreciated that each element of a particular strip head has a frontal edge in a common plane. Thus, in FIG. 1, the visible edges of conductors 2 and 4 and ferrite layers 3 all lie in a common vertical plane.

Figure 9:
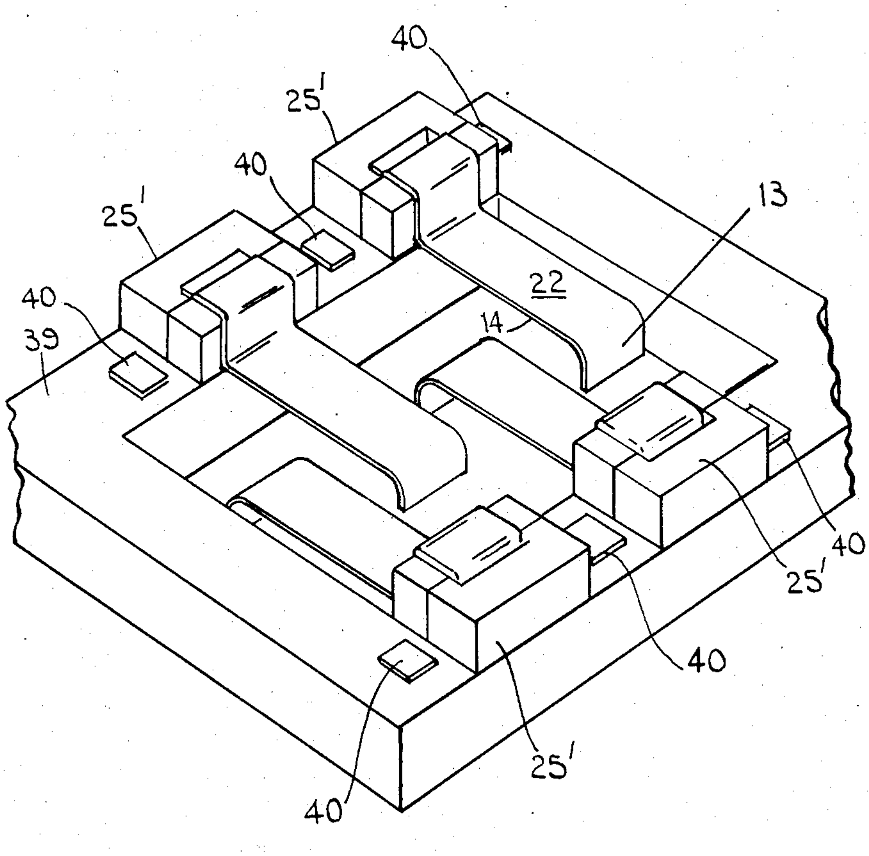
FIG. 9 diagrammatically illustrates a unit incorporating a number of the strip heads of FIG. 6.

In FIG. 9 there is shown four of the strip heads constructions of FIG. 6 mounted by the transformers 25 in a rectangular frame on pad 39.

The mounting of the strip head is such that conductors 14 and 22 of the strip transmission line provide resilient suspensions for the active head regions 13 of the strip heads conform to the instantaneous average disc (or of the record medium) surface.

The pad defines a primary platform from which is mounted by means (not shown) which allows freedom in elevation, roll and pitch with respect to the said record surface.

In practice read pre-amplifiers and write drivers as well as selection elements are positioned in close proximity to the head transformers. In the Figure the possible positions of such pre-amplifiers and drivers are schematically indicated as integrated circuit element 40.

It will be appreciable that by providing several heads on a common pad the need to provide a pad for each head is avoided.

As a result of producing heads by depositing layers of various materials, the size of the strip heads of the present invention is extremely small. For example, the head of FIG. 1 may be 0.005 to 0.010 inch wide and 0.002 inch tall. The length of the cantilevered transmission line of FIG. 6 may be on the order of 0.4 inch, for example.

In conclusion, the strip head of the present invention facilitates high frequency recording by presenting a low series impedance and leakage inductance since the energising conductor in the exact spot where the field needs to be created, thus reducing losses. By providing a conductive strip between two layers of ferrite, a recording magnetic field can be concentrated in a small area of a magnetic recording medium, thereby allowing a high packing density of data signals. Also, by minimising series impedances, the strip head of the present invention allows satisfactory signal to noise ratios to be achieved while reducing drive power requirements when writing. While the strip heads of the present invention are particularly suitable for recording data on magnetic discs, other types of recording media may be employed as well.

Although various conductive materials such as material 2 of FIG. 3 may be comprised of rhodium, other conductors which will withstand ferrite processing temperatures may be employed.

We claim:

1. A transducer arrangement for a magnetic recording apparatus comprising a transformer core structure; a first winding on the core structure; a single turn second winding of strip conductive material on said core structure inductively coupled with the first winding; first and second strip elements integral with the ends of the second winding and arranged in overlapping relationship; a strip of electrically insulating material interposed between the first and second elements and cooperating therewith to provide a mechanically self supporting substantially rigid strip transmission line extending from the second winding to provide at its end remote from the winding a mounting for a transducer head; said head including a layer of conductive material having a thickness defining a required transducer gap; first and second layers of readily magnetisable material positioned against opposite faces of the conductive layers to form with one edge of the conductive layer an active transducer gap and being in contact at a region remote from this edge to complete a magnetic circuit between the magnetic layers and across the gap, said head unit being located between the first and second elements at said remote end of the transmission line such that the active transducer gap is remote from the windings and such that a series electrical contact is completed from the first element to the second element through the electrically conductive layer whereby a continuous electrical circuit is provided through said second winding, said elements and said conductive layer whereby the head unit is operationally connected to and mechanically supported from the core structure solely by the transmission line.

2. A transducer arrangement as claimed in claim 1, in which the remote end portion of the strip elements are angled so as to be directed transverse to the remainder of the strip elements, whereby the active gap of the transducer head is offset with respect to the second winding.

3. A magnetic transducer apparatus including at least two transducer arrangements as claimed in claim 1, and a mounting element for carrying the core structures of each said arrangement, and comprising a ring-like member providing two substantially parallel bars ends for mounting at least one of said transducer arrangements so that the transducer head units are suspended by the transmission lines in predetermined position relative to the rails and to each other.

* * * * *